United States Patent
Nemiroff et al.

(10) Patent No.: US 8,521,006 B2
(45) Date of Patent: Aug. 27, 2013

(54) BOUNDARY DETECTION IN MEDIA STREAMS

(75) Inventors: Daniel Nemiroff, El Dorado Hills, CA (US); Balaji Vembu, Folsom, CA (US); Raul Gutierrez, El Dorado Hills, CA (US); Suryaprasad Kareenahalli, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 498 days.

(21) Appl. No.: 12/775,003

(22) Filed: May 6, 2010

(65) Prior Publication Data

US 2011/0274414 A1  Nov. 10, 2011

(51) Int. Cl.
*H04N 5/94* (2006.01)

(52) U.S. Cl.
USPC .......................................................... 386/263

(58) Field of Classification Search
None
See application file for complete search history.

(56) References Cited

U.S. PATENT DOCUMENTS

| | | | |
|---|---|---|---|
| 2006/0078290 A1* | 4/2006 | Shibutani | 386/52 |
| 2006/0104614 A1* | 5/2006 | Park | 386/95 |
| 2006/0171685 A1 | 8/2006 | Chen et al. | |
| 2006/0262862 A1 | 11/2006 | Cheng et al. | |
| 2007/0047648 A1 | 3/2007 | Tourapis et al. | |
| 2008/0187284 A1* | 8/2008 | Ikeda et al. | 386/69 |
| 2009/0196342 A1 | 8/2009 | Divorra Escoda et al. | |

OTHER PUBLICATIONS

Int'l Search Report and Written Opinion for Int'l Patent Application No. PCT/US2011/031699 mailed Jan. 2, 2012, 9 pgs.

* cited by examiner

*Primary Examiner* — David E. Harvey
*Assistant Examiner* — Daniel Tekle
(74) *Attorney, Agent, or Firm* — Blakely, Sokoloff, Taylor & Zafman LLP

(57) ABSTRACT

Encoded data decoding techniques. A data decoding agent determines a data segment size for a packet that includes a header and a data segment. The data decoding agent determines a segment end location based, at least in part, on the data segment size. The data decoding agent processes subblocks of data from the data segment. The data decoding agent compares a current location to the segment end location to determine if a current subblock of data from the data segments contains the segment end location. The data decoding agent triggers an exception handler if the current subblock contains the segment end location.

18 Claims, 4 Drawing Sheets

BOUNDARY DETECTION IN MEDIA STREAMS

TECHNICAL FIELD

Embodiments of the invention relate to techniques for media processing. More particularly, embodiments of the invention relate to techniques for detecting and responding to data boundaries in streams of media data.

BACKGROUND

Compressed video data is packaged in packets for delivery. Each of these packets has a specific size depending on the standard being used. For example, BLU-RAY™ has fixed transport packet sizes of 192 bytes while HD-DVD has boundaries every 2048 bytes. Each packet typically has a few header bytes that contain information on packet type and other packet characteristics. Because the packetization of data is independent of the video elements in the video stream, video elements (e.g., slice, frame) may span several packets. Video processing requires parsing the stream for specific data patterns (e.g., startcodes representing frame, slice boundaries, slice data).

BLU-RAY™ refers to optical discs that store data according to standards and formats provided by The Blu-Ray Disc Association. The name Blu-ray derives from the blue-violet laser used to read the disc. While a standard DVD uses a 650 nanometer red laser, Blu-ray players use a shorter wavelength, a 405 nm blue-violet laser, which allows for almost ten times more data storage than a standard DVD.

When processing such video elements, the processing entity (whether hardware or software) may encounter packet boundaries and must skip over packet headers to find the next valid video element data bits. The data structures in compressed video may be different sizes, and many structure sizes are determined just as the data is to be read such that the decoding software cannot predict if a transport packet will end before the compressed video structure. For example, a video structure might be 5 bytes long but the transport packet ends in 2 bytes. In this case the video structure continues in the next transport packet.

A further complication is that transport packets may have variable sized headers such that a spanned video data structure continues at a location that cannot be pre-determined until the length of the next header is understood. This complicates the video processing entity because it must constantly monitor to see if it hits a packet boundary and then jump into packet header parsing and then resume data processing.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The description herein is for a mechanism to detect when a decoding entity has reached a boundary which processing a stream of data. The boundary value can be setup by decoding software (e.g., 192 bytes, or 2048 bytes, etc). This alleviates decoding software from constantly checking, while processing data, if a boundary has been reached or will be reached while processing the current data element. Instead, when a boundary is crossed (in the above example, byte 3 is read) the decoding hardware may generate an exception, notifying the decoding software asynchronously that a boundary has been reached. While the description that follows is provided in terms of video data streams, the techniques are generally applicable to data streams in other formats.

In the description that follows a media decoder may include hardware fault engine with data boundary detection and software context save and restore capability and decoding software to run the hardware fault engine. In one embodiment, the hardware fault engine contains logic to monitor a current location of the stream buffer with respect to streams boundaries determined by the decoding software. In one embodiment, before starting execution for BLU-RAY™ parsing the decoding software will program the decoding hardware to monitor 192 byte boundaries.

For each data fetch from software, the decoding hardware determines if (in the case of BLU-RAY™) a 192 byte boundary has been crossed. When a software operation to read bits of a video symbol hits a boundary, the decoding hardware saves state of the processor and jumps to the fault handler. The software-based fault handler executes the necessary boundary interrupt code and executes a hardware instruction for the hardware to restart stream processing where it left off. The decoding hardware restores state including partially consumed stream data, appends this to the stream data in the subsequent fetch and continues code execution where it left off.

Figure 1:
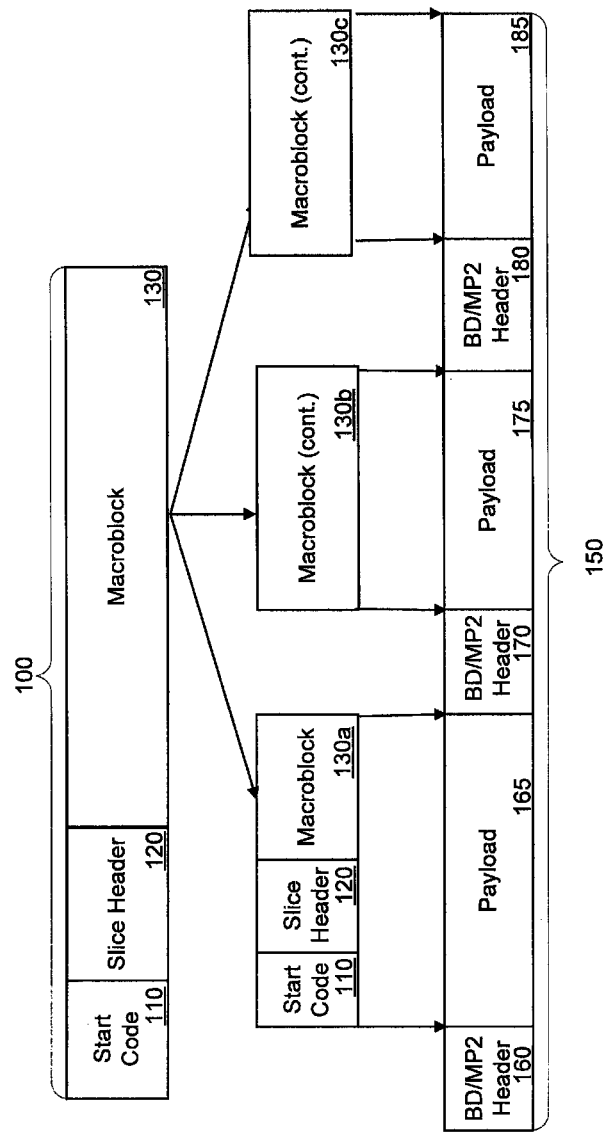
FIG. 1 is a conceptual diagram of a conversion of video data to a standardized stream of video data blocks.

FIG. 1 is a conceptual diagram of a conversion of video data to a standardized stream of video data blocks. The example of FIG. 1 corresponds to transformation of the original video data to BLU-RAY™ MPEG2 Transport Packets. A similar transformation may be applied to the original data to result in data packets according to a different encoding standard.

Original video data 100 includes start code 110, slice header 120 and macroblock 130. Start code 100 indicates the start of the video stream. Start code 100 can be any predetermined code that is known to indicate the start of the video stream. Slice header 120 is a header that corresponds to original video data 100. Slice header 120 includes information related to original video data 100, for example, type of video encoding used, size of macroblock 130, source of video data, and/or other information.

Macroblock 130 includes the video data to be encoded and/or transmitted. Encoded video stream 150 includes multiple packets each having a portion of original video data 100 including start code 110, slice header 120 and macroblock 130. Encoded video stream 150 is presented as a BLU-RAY™ video stream. Other encoding schemes will result in slightly different packet/header/payload configurations.

In one embodiment, encoded video stream 150 starts with BD/MP2 header 160 that includes information related to the subsequent payload 165. Because header 160 is the first header payload includes start code 110, slice header 120 and a portion of macroblock 130 (labeled 130a). In one embodiment, payload 165 is a fixed length portion of a packet.

Payload 165 is followed by BD/MP2 header 170 that includes information related to the subsequent payload 175. Payload 175 includes the next portion of macroblock 130 (labeled 130b). In one embodiment, the first byte of macroblock 130b is the byte immediately following the last byte of macroblock 130a as originally arranged in macroblock 130.

Payload 175 is followed by BD/MP2 header 180 that includes information related to the subsequent payload 185. Payload 185 includes the next portion of macroblock 130 (labeled 130c). In one embodiment, the first byte of macroblock 130c is the byte immediately following the last byte of macroblock 130b as originally arranged in macroblock 130. While the example of FIG. 1 includes only three header/payload segments, any number of header/payload segments can be supported.

Figure 2:
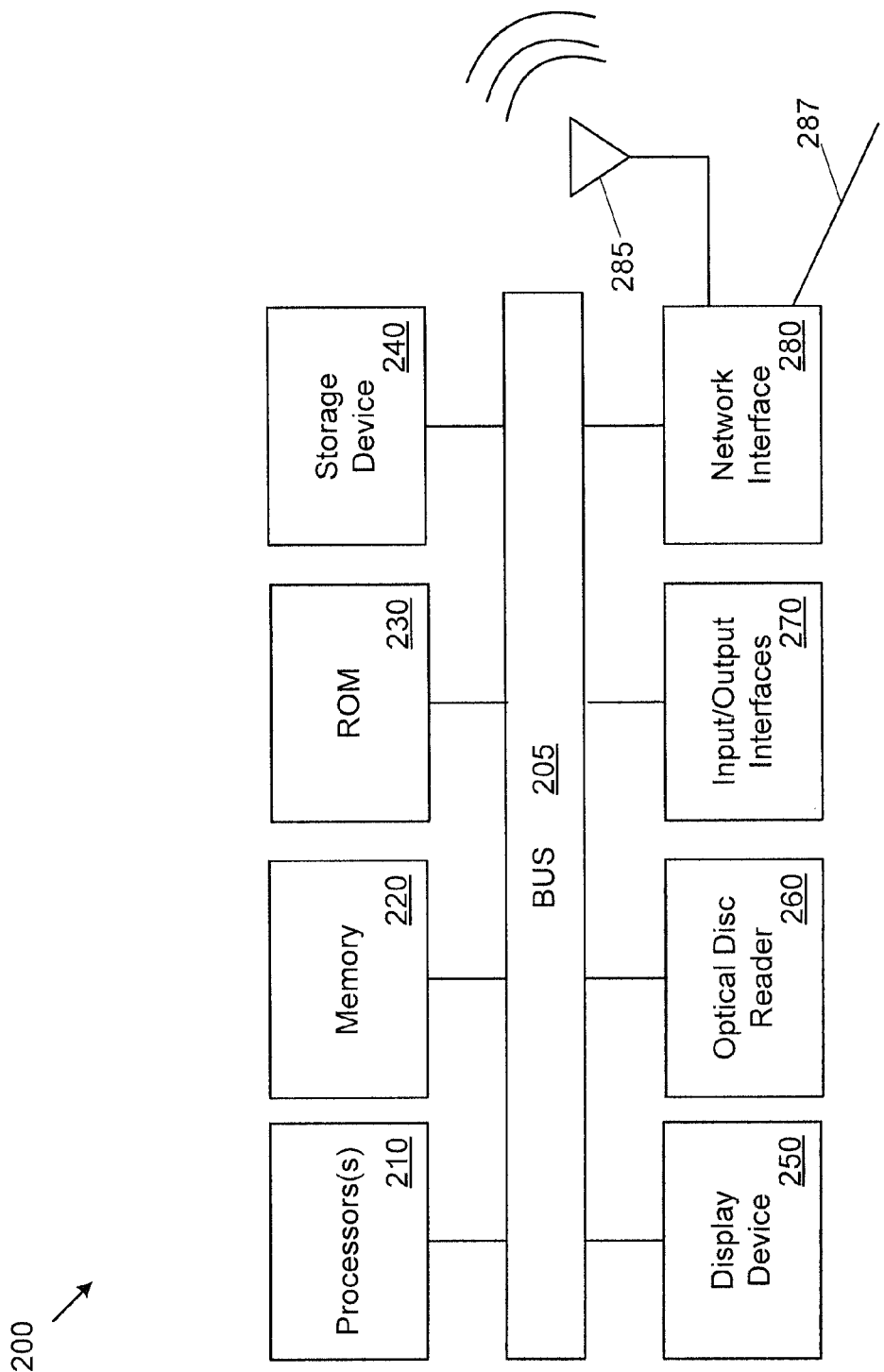
FIG. 2 is a block diagram of one embodiment of an electronic system.

FIG. 2 is a block diagram of one embodiment of an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 200 includes bus 205 or other communication device to communicate information, and processor(s) 210 coupled to bus 205 that may process information. While electronic system 200 is illustrated with a single processor, electronic system 200 may include multiple processors and/or co-processors. Electronic system 200 further may include random access memory (RAM) or other dynamic storage device 220 (referred to as main memory), coupled to bus 205 and may store information and instructions that may be executed by processor 210. Main memory 220 may also be used to store temporary variables or other intermediate information during execution of instructions by processor 210.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 also includes optical disc reader 260 coupled with bus 205. Optical disc reader 260 may be any type of optical disc reader known in the art, for example, a Compact Disc (CD) reader, a Digital Versatile Disc (DVD) reader, a BLU-RAY™ reader. Optical disc reader 260 may also have the ability to write data to an optical disc. One or more components of electronic system 200 may function in the manner described herein to provide video data decoding for video data stored on a disc read by optical disc reader 260.

Electronic system 200 may also be coupled via bus 205 to display device 250, such as a cathode ray tube (CRT) or liquid crystal display (LCD), to display information to a user. Input/output devices 270 are also coupled with bus 205, such as a keyboard, a mouse, a trackball, or cursor direction keys to communicate information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Traditionally, when processing data streams, the decoding software must check, before consuming each data element (or moving the stream forward), if a boundary has or will be reached. The traditional method of checking the location of the stream before consuming data dramatically increases the number of software instructions required to parse a video stream. For example, the pseudo-code below:

```
while (streamSize>0) {
    if (!Current Location+next structure size % packet size)
    then execute boundary handler
    else
    consume next data structure
}
```

The techniques described herein allow for a simplified decoder software structure that can be described by the pseudo-code below:

```
while (streamSize>0) {
    consume next data structure
}
```

Thus, none of the "if" block checks are required. This significantly simplifies the processing code because the decoder software gets a contiguous view of the video stream to be decoded.

In one embodiment, decoding techniques described herein utilize hardware mechanism to track the stream location as data is fetched from buffers. If a stream location crosses a boundary the hardware faults, stores the context, and executes a fault handler. The fault handler determines where to continue processing. The hardware also splices the unconsumed bits from the previous packet with the valid bits of the next packet to provide the appearance of a contiguous stream without the packet header interleave.

Figure 3:
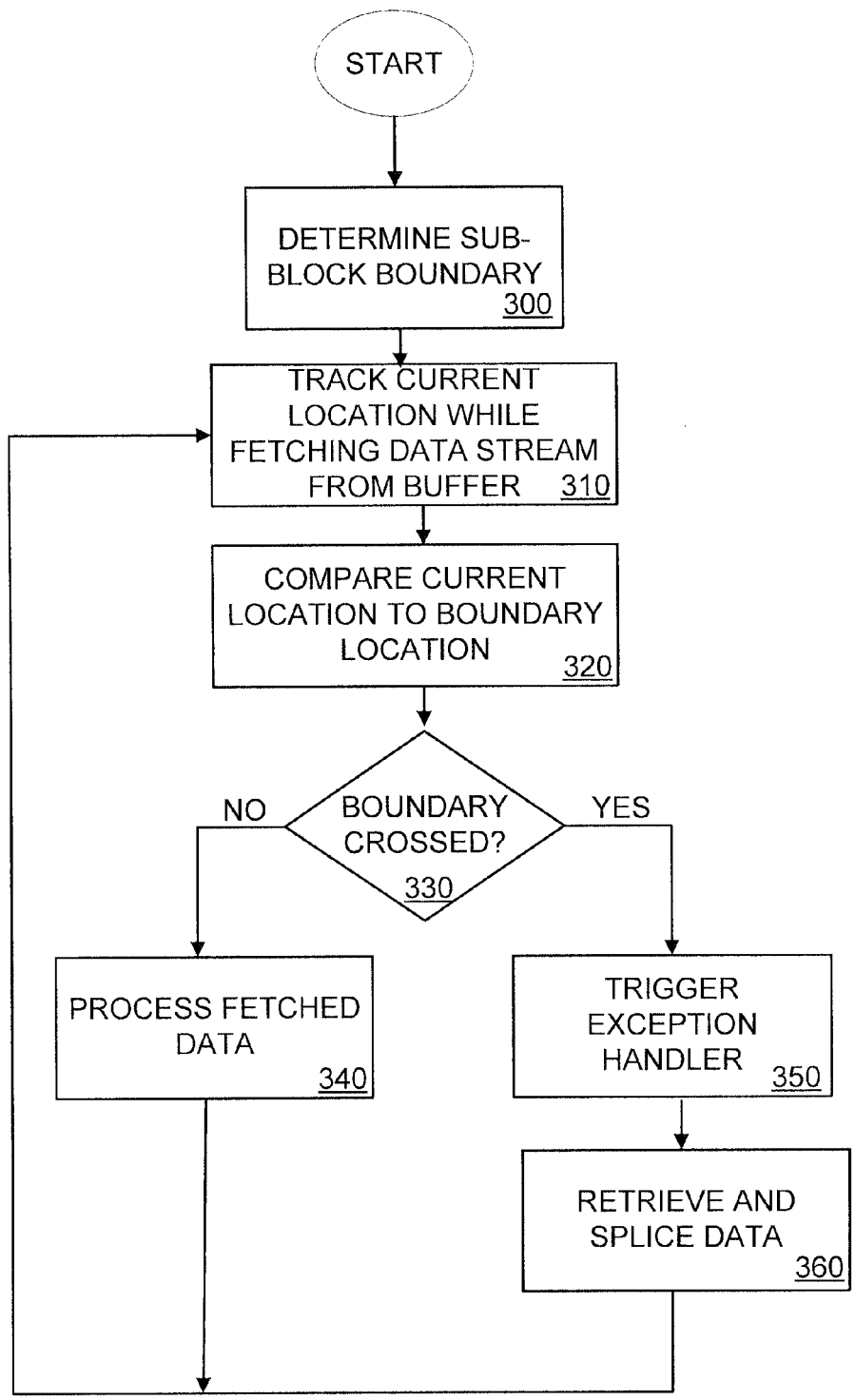
FIG. 3 is a flow diagram of one embodiment of a technique for decoding an encoded video data stream.

FIG. 3 is a flow diagram of one embodiment of a technique for decoding an encoded video data stream. The technique described with respect to FIG. 3 is described in detail for 192-byte fixed size payloads. However, as described above, other payload sizes may be supported as well as variable-sized payloads where the payload size is indicated, for example, by a value stored in a header field.

The sub-block (or packet payload) size is determined, 300. For a fixed-size payload, the payload size may be pre-programmed in, for example, a hardware register in the video decoder circuitry. Alternatively, the payload size may also be stored in other manners. For a variable-sized payload, the video decoder may parse the packet header to find a field having stored therein the payload size. The payload size may then be stored in a register or other storage mechanism.

The current location in the stream of data is tracked, 310. In one embodiment, the payload data from one or more packets is stored in a hardware buffer and retrieved as the data is decoded. A pointer or other tracking mechanism is used to determine the location of the data in the buffer to be decoded.

The current location is compared to the stored boundary location, 320. In one embodiment, this comparison is accomplished by the hardware decoder circuitry. If a boundary is not crossed by the sub-block of data being decoded, 330, the sub-block of data is decoded and/or otherwise processed, 340. Subsequent sub-blocks of data are processed in a similar manner (310, 320, 330, 340).

If a boundary is crossed by the sub-block of data being decoded, 340, the decoder hardware triggers an exception handler, 350. In one embodiment, an exception handler is utilized rather than an interrupt handler because the exception handler can be called during instruction execution and can return to the mid-instruction condition to complete execution of the instruction after the exception handler completes. This allows for boundary processing without determining whether a boundary will be crossed prior to instruction execution, which simplifies video decoder software, as discussed above.

The exception handler retrieves data from the subsequent packet and splices data from the subsequent packet to the partial sub-block from the current packet, 360. This allows the video decoder hardware to operate on a complete sub-block of data without parsing the data packets for the subsequent video data. Subsequent sub-blocks of data are processed in as described above (310, 320, 330, 340).

Figure 4:
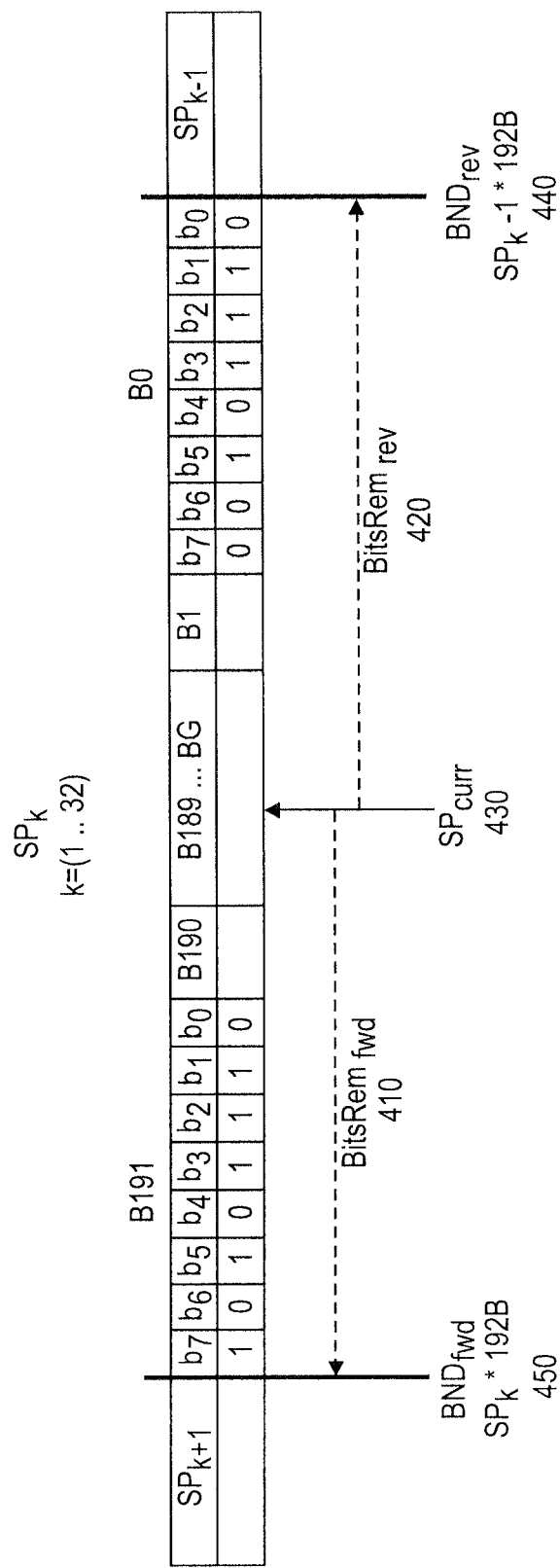
FIG. 4 is an example stream buffer that may be utilized in video decoding.

FIG. 4 is an example stream buffer that may be utilized in video decoding. In one embodiment, the stream buffer maintains a count of how many bits remain in both directions (forward and reverse) to the next (upper and lower) boundary. The example of FIG. 4 illustrates the conceptual relationships between the stream pointer and the upper and lower boundaries for a 192-byte payload.

In one embodiment, the boundary of interest is determined by the video decoding software. In one embodiment, bits remaining are utilized to determine how many bits the Stream Pointer (SP) could have been moved prior to crossing a boundary. This will allow the video decoder hardware to determine when a boundary is crossed and how many valid bits were remaining in the direction of the stream pointer movement which resulted in a boundary fault.

In one embodiment, bits remaining in the reverse direction is calculated, for example, as $$SP\_next[15:0]-dec2bin((Current\_SupPack\_Cnt-1)*192d*8)$$

for a 192-byte payload. Other calculations would be used for other payload sizes.

In the example of FIG. 4, stream buffer 400 stores data from one or more media packets having payloads of data to be decoded. Stream pointer ($SP_{curr}$) 430 indicates the current location of data to be decoded. Bits Remaining Forward ($BitsRem_{fwd}$) 410 indicates the number of bits (or bytes, etc.) between stream pointer 430 and forward boundary ($BND_{fwd}$) 450. Similarly, Bits Remaining Reverse ($BitsRem_{rev}$) 420 indicates the number of bits (or bytes, etc.) between stream pointer 430 and reverse boundary ($BND_{rev}$) 440.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising: determining, with a video data decoding agent, a data segment size for a packet that includes a header and a data segment, wherein for a fixed-size payload, the payload size is pre-programmed in a hardware register in the video decoder agent and for a variable-sized payload, the video decoder parses the header to find a field having stored therein the payload size; determining, with the video data decoding agent, a segment end location based, at least in part, on the data segment size; maintaining, with a stream buffer, a count of how many bits remain in both forward and reverse directions to the next upper and lower boundary within data packets; processing, with the video data decoding agent, sub-blocks of data from the data segment; comparing, with the video data decoding agent, a current location to the segment end location to determine if a current subblock of data from the data segments contains the segment end location; triggering, with the video data decoding agent, an exception handler if the current subblock contains the segment end location.

2. The method of claim 1 further comprising processing the current subblock of data from the data segments if the current subblock does not contain the segment end location.

3. The method of claim 1 wherein triggering the exception handler comprises:
storing a context associated with a host system when the current location equals the segment end location;
executing the exception handler, which causes the host system to:
parses a subsequent packet for a beginning of a data segment of the subsequent packet,
combines unprocessed data from the current subblock with data from the data segment of the subsequent packet to create a complete subblock of data, and
returning to processing of the complete subblock of data with the video decoding agent.

4. The method of claim 1 wherein each packet comprises a header and a 192-byte data segment containing video data.

5. The method of claim 1 wherein each packet comprises a header and a 2048-byte data segment containing video data.

6. The method of claim 1 wherein each packet comprises a header and a variable-length data segment containing video data, the header including a field indicating a length of the variable-length data segment.

7. An article comprising a tangible, non-transitory storage medium having stored thereon instructions that, when executed by one or more processors, cause the one or more processors to: determine, with a video data decoding agent, a data segment size for a packet that includes a header and a data segment, wherein for a fixed-size payload, the payload size is pre-programmed in a hardware register in the video decoder agent and for a variable-sized payload, the video decoder parses the header to find a field having stored therein the payload size; determine, with the video data decoding agent, a segment end location based, at least in part, on the data segment size; maintain, with a stream buffer, a count of how many bits remain in both forward and reverse directions to the next upper and lower boundary within data packets; process, with the video data decoding agent, subblocks of data from the data segment; compare, with the video data decoding agent, a current location to the segment end location to determine if a current subblock of data from the data segments contains the segment end location; trigger, with the video data decoding agent, an exception handler if the current subblock contains the segment end location.

8. The article of claim 7 further comprising instructions that, when executed, cause the one or more processors to process the current subblock of data from the data segments if the current subblock does not contain the segment end location.

9. The article of claim 7 wherein the instructions that cause the one or more processors to trigger the exception handler comprises instructions that, when executed, cause the one or more processors to:
   store a context associated with a host system when the current location equals the segment end location;
   execute the exception handler, which causes the host system to:
      parse a subsequent packet for a beginning of a data segment of the subsequent packet,
      combine unprocessed data from the current subblock with data from the data segment of the subsequent packet to create a complete subblock of data, and
      return to processing of the complete subblock of data with the video decoding agent.

10. The article of claim 7 wherein each packet comprises a header and a 192-byte data segment containing video data.

11. The article of claim 7 wherein each packet comprises a header and a 2048-byte data segment containing video data.

12. The article of claim 7 wherein each packet comprises a header and a variable-length data segment containing video data, the header including a field indicating a length of the variable-length data segment.

13. A system comprising: an optical disc reader; a memory; a video decoding agent coupled with the optical disc reader and the memory, the video decoding agent to determine a data segment size for a packet that includes a header and a data segment, wherein for a fixed-size payload, the payload size is pre-programmed in a hardware register in the video decoder agent and for a variable-sized payload, the video decoder parses the header to find a field having stored therein the payload size, determine a segment end location based, at least in part, on the data segment size, maintain, with a stream buffer, a count of how many bits remain in both forward and reverse directions to the next upper and lower boundary within data packets, process subblocks of data from the data segment, compare a current location to the segment end location to determine if a current subblock of data from the data segments contains the segment end location, and trigger an exception handler if the current subblock contains the segment end location, the video decoding agent to cause decoded video data to be stored in the memory.

14. The system of claim 13 further wherein the video decoding agent processes the current subblock of data from the data segments if the current subblock does not contain the segment end location.

15. The system of claim 13 the video decoding agent further to
   store a context associated with a host system when the current location equals the segment end location, to parse a subsequent packet for a beginning of a data segment of the subsequent packet, combine unprocessed data from the current subblock with data from the data segment of the subsequent packet to create a complete subblock of data, and return to processing of the complete subblock of data with the video decoding agent.

16. The system of claim 15 wherein each packet comprises a header and a 192-byte data segment containing video data.

17. The system of claim 15 wherein each packet comprises a header and a 2048-byte data segment containing video data.

18. The system of claim 15 wherein each packet comprises a header and a variable-length data segment containing video data, the header including a field indicating a length of the variable-length data segment.

* * * * *